(12) United States Patent
Djupsjöbacka et al.

(10) Patent No.: US 6,232,895 B1
(45) Date of Patent: May 15, 2001

(54) METHOD AND APPARATUS FOR ENCODING/DECODING N-BIT DATA INTO 2N-BIT CODEWORDS

(75) Inventors: Anders Djupsjöbacka; Peeter Ellervee, both of Solna; Mehran Mokhtari, Spanga, all of (SE)

(73) Assignee: Telefonaktiebolaget LM Ericsson, Stockholm (SE)

( * ) Notice: Subject to any disclaimer, the term of this patent is extended or adjusted under 35 U.S.C. 154(b) by 0 days.

(21) Appl. No.: 09/008,608

(22) Filed: Jan. 16, 1998

(30) Foreign Application Priority Data

Jan. 17, 1997 (SE) .................................................. 9700125

(51) Int. Cl.[7] .................................................. H03M 9/00
(52) U.S. Cl. ........................... 341/100; 341/107; 341/101
(58) Field of Search .................................... 341/100, 101, 341/58, 50, 35, 107

(56) References Cited

U.S. PATENT DOCUMENTS

| 4,517,552 | * | 5/1985 | Shirota et al. ............................ 341/58 |
| 4,864,303 | | 9/1989 | Ofek ........................................ 341/95 |
| 5,012,240 | | 4/1991 | Takahashi et al. .................... 341/101 |
| 5,025,256 | * | 6/1991 | Stevens ................................. 341/102 |
| 5,128,673 | * | 7/1992 | Tamamura et al. ................... 341/100 |
| 5,483,540 | | 1/1996 | Okamura .............................. 370/112 |
| 5,490,282 | | 2/1996 | Dreps et al. .......................... 395/821 |
| 5,561,423 | | 10/1996 | Morisaki .............................. 341/100 |
| 5,612,695 | * | 3/1997 | Ueda .................................... 341/100 |
| 5,808,571 | * | 9/1998 | Kuwata et al. ....................... 341/100 |

FOREIGN PATENT DOCUMENTS

0310041A2   4/1989  (EP) .

OTHER PUBLICATIONS

S. Benedetto, et al.; "Digital Transmission Theory"; 1987; Prentice–Hall Inc.; pp. 408–410.

* cited by examiner

Primary Examiner—Peguy JeanPierre

(57) ABSTRACT

The present invention relates to the encoding and decoding respectively of serial data, using block codes. Encoding of a serial bit stream of input data in groups of N bits, so-called words (O), to serial output data in groups of 2N bits, so-called code words (KO), is preferably carried out by a logic circuit in a manner such that N of the 2N bits in the code words (KO) are comprised of the N bits input data, unchanged or inverted, and remaining bits in the code words (KO) are determined so that, seen statistically, the code words (KO) will include approximately as many zeros as ones, such that each code word (KO) will be unique for each word (O), and such that at least one of the code words (KO) will remain unique even in bit stream shifting processes. Decoding includes further encoding in a similar logic circuit and comparison of the incoming code words with the code words encoded in the logic circuit, in a predetermined manner.

25 Claims, 6 Drawing Sheets

| Clock signal | ⎍ | ⎍⎍ | ⎍⎍⎍ | ⎍⎍⎍⎍ | ⎍⎍⎍⎍⎍ | ⎍⎍⎍⎍⎍⎍ |
|---|---|---|---|---|---|---|
| Clock level | High | Low | High | Low | High | Low |
| Transp. mode | LX2 | LX1 | LX2 | LX1 | LX2 | LX1 |
| Block mode | LX1 | LX2 | LX1 | LX2 | LX1 | LX2 |
| Selector | A | B | A | B | A | B |
| u11 | a4 | a6 | a6 | a8 | a8 | a10 |
| u21 | a3 | a5 | a5 | a7 | a7 | a9 |
| u31 | a2 | a4 | a4 | a6 | a6 | a8 |
| u41 | a1 | a3 | a3 | a5 | a5 | a7 |
| u12 | a5 | a5 | a7 | a7 | a9 | a9 |
| u22 | a4 | a4 | a6 | a6 | a8 | a8 |
| u32 | a3 | a3 | a5 | a5 | a7 | a7 |
| u42 | a2 | a2 | a4 | a4 | a6 | a6 |
| U1 | a4 | a5 | a6 | a7 | a8 | a9 |
| U2 | a3 | a4 | a5 | a6 | a7 | a8 |
| U3 | a2 | a3 | a4 | a5 | a6 | a7 |
| U4 | a1 | a2 | a3 | a4 | a5 | a6 |

| Clock signal | ⎍ | ⎍⎍ | ⎍⎍⎍ | ⎍⎍⎍⎍ | ⎍⎍⎍⎍⎍ | ⎍⎍⎍⎍⎍⎍ |
|---|---|---|---|---|---|---|
| Clock edge/level | + High | - Low | + High | - Low | + High | - Low |
| Triggering | MS11, MS21 | MS12, MS22 | MS12, MS21 | MS12, MS22 | MS12, MS21 | MS12, MS22 |
| Selector | A | B | A | B | A | B |
| v11 | a5 | a5 | a7 | a7 | a9 | a9 |
| v21 | a3 | a3 | a5 | a5 | a7 | a7 |
| v12 | a4 | a6 | a6 | a8 | a8 | a10 |
| v22 | a2 | a4 | a4 | a6 | a6 | a8 |
| V1 | a5 | a6 | a7 | a8 | a9 | a10 |
| V2 | a4 | a5 | a6 | a7 | a8 | a9 |
| V3 | a3 | a4 | a5 | a6 | a7 | a8 |
| V4 | a2 | a3 | a4 | a5 | a6 | a7 |

| O | | | | KO | | | | | | | |
|---|---|---|---|---|---|---|---|---|---|---|---|
| A | B | C | D | A' | B' | C' | D' | E' | F' | G' | H' |
| 0 | 0 | 0 | 0 | 0 | 0 | 0 | 1 | 0 | 1 | 1 | 1 |
| 0 | 0 | 0 | 1 | 0 | 0 | 0 | 0 | 1 | 1 | 1 | 1 |
| 0 | 0 | 1 | 0 | 0 | 0 | 1 | 1 | 0 | 1 | 0 | 1 |
| 0 | 0 | 1 | 1 | 0 | 0 | 1 | 0 | 1 | 1 | 0 | 1 |
| 0 | 1 | 0 | 0 | 0 | 1 | 0 | 1 | 0 | 0 | 1 | 1 |
| 0 | 1 | 0 | 1 | 0 | 1 | 0 | 0 | 1 | 1 | 1 | 0 |
| 0 | 1 | 1 | 0 | 0 | 1 | 1 | 1 | 0 | 0 | 1 | 0 |
| 0 | 1 | 1 | 1 | 0 | 1 | 1 | 0 | 1 | 0 | 0 | 1 |
| 1 | 0 | 0 | 0 | 1 | 0 | 0 | 1 | 0 | 1 | 1 | 0 |
| 1 | 0 | 0 | 1 | 1 | 0 | 0 | 0 | 1 | 1 | 0 | 1 |
| 1 | 0 | 1 | 0 | 1 | 0 | 1 | 1 | 0 | 0 | 0 | 1 |
| 1 | 0 | 1 | 1 | 1 | 0 | 1 | 0 | 1 | 1 | 0 | 0 |
| 1 | 1 | 0 | 0 | 1 | 1 | 0 | 1 | 0 | 0 | 1 | 0 |
| 1 | 1 | 0 | 1 | 1 | 1 | 0 | 0 | 1 | 0 | 1 | 0 |
| 1 | 1 | 1 | 0 | 1 | 1 | 1 | 1 | 0 | 0 | 0 | 0 |
| 1 | 1 | 1 | 1 | 1 | 1 | 1 | 0 | 1 | 0 | 0 | 0 |

Fig. 7

```
DATA --> DATA'

A' = A
B' = B
C' = C
D' = $\overline{D}$
E' = D
IF A = 0 THEN
    $\overline{F'}$ = B*C + B*$\overline{D}$
    $\overline{G'}$ = C*D + $\overline{B}$*C
    $\overline{H'}$ = B*C*$\overline{D}$ + B*$\overline{C}$*D
IF A = 1 THEN
    F' = $\overline{B}$*$\overline{C}$ + $\overline{B}$*D
    G' = $\overline{C}$*$\overline{D}$ + B*$\overline{C}$
    H' = $\overline{B}$*$\overline{C}$*D + $\overline{B}$*C*$\overline{D}$
```

Fig. 8

| O | | | | KO | | | | | | | |
|---|---|---|---|---|---|---|---|---|---|---|---|
| A | B | C | D | A' | B' | C' | D' | E' | F' | G' | H' |
| 0 | 0 | 0 | 0 | 0 | 0 | 0 | 1 | 0 | 1 | 1 | 1 |
| 0 | 0 | 0 | 1 | 0 | 0 | 0 | 1 | 1 | 0 | 1 | 1 |
| 0 | 0 | 1 | 0 | 0 | 0 | 1 | 1 | 0 | 1 | 0 | 0 |
| 0 | 0 | 1 | 1 | 0 | 0 | 1 | 0 | 1 | 0 | 1 | 1 |
| 0 | 1 | 0 | 0 | 0 | 1 | 0 | 1 | 0 | 1 | 0 | 0 |
| 0 | 1 | 0 | 1 | 0 | 1 | 0 | 0 | 1 | 1 | 1 | 1 |
| 0 | 1 | 1 | 0 | 0 | 1 | 1 | 0 | 0 | 1 | 0 | 0 |
| 0 | 1 | 1 | 1 | 0 | 1 | 1 | 0 | 1 | 0 | 1 | 1 |
| 1 | 0 | 0 | 0 | 1 | 0 | 0 | 1 | 0 | 1 | 0 | 0 |
| 1 | 0 | 0 | 1 | 1 | 0 | 0 | 1 | 1 | 0 | 1 | 1 |
| 1 | 0 | 1 | 0 | 1 | 0 | 1 | 1 | 0 | 0 | 0 | 0 |
| 1 | 0 | 1 | 1 | 1 | 0 | 1 | 0 | 1 | 0 | 1 | 1 |
| 1 | 1 | 0 | 0 | 1 | 1 | 0 | 1 | 0 | 1 | 0 | 0 |
| 1 | 1 | 0 | 1 | 1 | 1 | 0 | 0 | 1 | 0 | 1 | 1 |
| 1 | 1 | 1 | 0 | 1 | 1 | 1 | 0 | 0 | 1 | 0 | 0 |
| 1 | 1 | 1 | 1 | 1 | 1 | 1 | 0 | 1 | 0 | 0 | 0 |

Fig. 9

```
DATA --> DATA'

METHOD AND APPARATUS FOR ENCODING/DECODING N-BIT DATA INTO 2N-BIT CODEWORDS

FIELD OF INVENTION

The present invention relates to an arrangement and to a method for encoding serial data using block code, to an arrangement and method for serial-parallel conversion and decoding of encoded data respectively, and to a transmission system, particularly a multi-channel fibre-optics system, utilizing said encoding facility on at least one transmitter side and said decoding facility on at least one receiver side.

DESCRIPTION OF THE BACKGROUND ART

Encoding of a serial data bit stream using block codes, particularly channel encoding, can be effected by dividing the data bit stream into words or blocks, wherein there is added to each block a number of check bits which are solely dependent on the data bits within the block.

Encoding is often effected by serial-parallel conversion at the input of an encoder, followed by the performance of logic operations, i.e. the actual encoding process in which the check bits are added. Finally, parallel-serial conversion is effected at the encoder output. A clock pulse is used for triggering the read-in of the serial bit stream at the input, i.e. read-in occurs at each positive or negative edge of the clock pulse.

However, it is difficult to implement block coding at high transmission speeds, for instance in optical high speed systems in the Gbit/s range. It is particularly difficult to implement a simple encoding logic operation and synchronising logic operation which will allow high speeds. Serial-parallel conversion and parallel-serial conversion respectively can also constitute limiting factors. Furthermore, there is required an encoding process which is not highly demanding with respect to lower and upper cut-off frequencies in regard of amplifiers included in the transmission system.

Among other things, this requires encoding that will retain a d.c. stability, particularly in the case of optical high-speed transmissions, i.e. encoding which contains roughly the same number of ones as zeros, and encoding where the maximum number of consecutive symbols of the same kind, for instance ones or zeros, is low.

SUMMARY OF THE INVENTION

An object of the present invention is to provide an arrangement and a method for encoding and decoding at high transmission rates, particularly in the Gbit/s range, using block codes to this end.

This is achieved by encoding a serial bit stream of input data in groups of N bits to serial encoded data in groups of 2N bits with the aid of an encoder which includes a serial-parallel converter, a logic circuit and a parallel-serial converter. Decoding is effected with a decoder that includes a serial-parallel converter, a logic circuit, a comparitor and a parallel-serial converter.

The encoder logic circuit is so constructed that N of the 2N bits of encoded data are comprised of the N bits input data, either unchanged or inverted, wherein remaining bits are determined such that, seen statistically, the groups of encoded data will include roughly as many zeros as ones, wherein each group of encoded data is unique for each group of non-encoded data, and wherein at least one of the groups of encoded data remains unique in shifting processes in the bit stream.

The decoder is constructed so that the encoded words are read-in and serial-parallel converted. The N bits of non-encoded data are separated and encoded one more time. This is effected in the decoder logic circuit, which is identical to the aforedescribed encoder logic circuit. The code words encoded in the decoder logic circuit are compared with the code words incoming to the decoder. When the comparison shows a predetermined result, the non-coded data separated from the N bits is parallel-serial converted.

Another object of the invention is to provide simple unsynchronized read-in and serial-parallel conversion of encoded data when decoding.

A third object of the invention is to enable the serial-parallel conversion process for use in decoding a clock pulse or clock signal of the same frequency as that used when encoding.

There is preferably used a serial-parallel converter which utilizes both positive and negative edges of a clock signal for clocking, and whose frequency is half the value of the bit rate of the encoded serial bit stream. The serial-parallel converter will also conveniently be adapted to read all bits in the serial bit stream, and to carry out complete demultiplexing of the 2N bits last read-in for each bit that is read-in.

Such a serial-parallel converter can be implemented, for instance, with the aid of a first shift register and a second shift register arranged in parallel therewith, each register including 2N latches and 2N selectors. The latches in the first shift register are adapted to be clocked alternately at a low level clock signal, beginning with the first, and alternately at a high level clock signal. The latches in the second shift register are adapted to be clocked alternately at a low level clock signal, beginning with the second and alternately at a high level clock signal. The selectors are preferably adapted to select data from those latches that are not clocked after each edge of the clock signal.

One advantage with the invention is that it provides simple and reliable encoding and decoding even at high and very high transmission speeds.

Another advantage with the invention is that complete demultiplexing is carried out for each bit read into the decoder. This simplifies the read-in of encoded data and no prior synchronisation need be achieved.

Still another advantage of the invention is that the decoder is able to use both edges of a clock signal, and consequently both the encoder and the decoder can be implemented with clock signals of mutually the same frequency.

Yet another advantage of the invention is that low demands are placed on the lower cut-frequency of amplifiers in the system, because d.c. stability is maintained and because the maximum number of consecutive symbols, i.e. ones or zeros, is limited.

BRIEF DESCRIPTION OF THE DRAWINGS

The invention will now be described in more detail with reference to the accompanying drawings, which are intended merely to illustrate the invention and shall therefore not be taken as limiting the scope thereof.

FIG. 7 is a code table for one embodiment of the encoder.

FIG. 8 illustrates a logic function for said encoder embodiment.

FIG. 9 is a code table for a second embodiment of the encoder.

FIG. 10 illustrates a logic function for said second embodiment of the encoder.

DESCRIPTION OF PREFERRED EMBODIMENTS

Encoder

Figure 1:
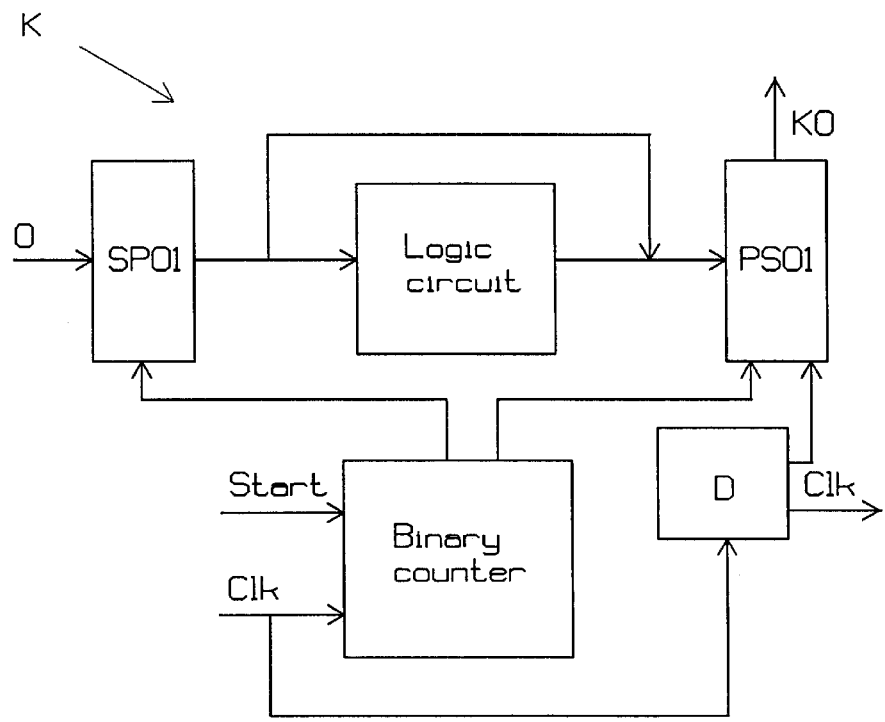
FIG. 1 illustrates an encoder for encoding serial data, using block codes in accordance with the invention.

FIG. 1 illustrates an inventive encoder K. The encoder includes a serial-parallel converter SP01, a logic circuit and a parallel-serial converter PS01. Clock signals from a clock Clk are required for synchronizing purposes.

The serial-parallel converter SP01 can be based on a shift register which reads incoming data in groups of N bits, so-called words O, for instance at each positive or negative edge of a clock signal arriving from the clock Clk, wherewith serial-parallel conversion is carried out. The clock signal may have the form of a square wave or a sine wave. Each word O to be encoded is then moved to a second stage in the shift register each Nth period of the clock signal. This sampling signal is generated each Nth period by a binary counter of the frequency divider kind, for instance. The inverted values may also be available on the output of the serial-parallel converter SP01.

The logic circuit reads the N bits of sampled data in the word and generates a complementary part of N bits, called check bits. Together with the bits of the non-coded word, there are generated 2N bits of code, a so-called code word KO. The logic circuit will preferably include functionally complete two-level gate structures, such as NOR-NOR or AND-OR, for instance.

The characteristics of the code will be described below integrated with described hardware. The code can then be further characterized to adapt the code preferably to fibre optic communication.

Code characteristics:

1. Encoded data shall contain twice as many bits as non-coded data. This is to enable the same clock bandwidth to be used on a decoding side as that used on the encoding side. In two following examples, words O containing four bits of data are encoded to code words KO that comprise eight bits.

2. Half of the bits in a code word KO will preferably comprise the bits included in the word O. Alternatively and particularly when inverted data is available on the serial-parallel converter outputs, half of the bits in a code word KO may comprise this inverted data. These bits may be placed essentially in the first half of the code word KO. This is because the parallel-serial converter PS01 can be made much simpler when no buffer, e.g. pipe-lining stage, is required to align data before multiplexing can take place.

3. The resultant code will also preferably be characterized by so-called d.c. stability, i.e. the code must contain equally as many zeros as ones. This requirement is because d.c stability requires a low bottom cut-off frequency or high dynamics of amplifiers included in the system. The d.c. stability will preferably be statistical or strict. By statistical d.c. stability is meant that the code words must on average contain as many ones as zeros, although individual code words may contain different numbers of ones and zeros. By strict d.c. stability is meant that each individual code word must contain as many ones as zeros. The resultant code shall also include a predictable maximum number of consecutive symbols of mutually the same kind, i.e. ones or zeros, so as to guarantee a sufficiently high lower cut-off frequency in the decoder.

4. Each code word must, of course, be unique to each word.

5. In order to simplify a decoding mechanism to the best possible extent, it is necessary that synchronization can be effected solely on the incoming bit stream. A self-synchronizing code shall therefore be used, i.e. the generated code must contain its own peculiarity, even if a data shifting procedure occurs prior to decoding. In principle, it is sufficient for one single code word to remain unique in shifting processes in the data bit stream, or for code words that contain solely ones and solely zeros to remain unique, for instance. A more stringent requirement is that all code words shall remain unique in bit stream shifting processes. The logic for picking up synchronization in the decoder then becomes simpler.

Further code characteristics which although not necessary are able to simplify hardware implementation are that at least one of the 2N bits in the code words KO is comprised of the inverted value of one of the N bits in the word O. The number of bits in the code word KO that are comprised of inverted bits, input data, is preferably maximised while taking other conditions into consideration. The logic circuit can be simplified still further when the inverted values are available directly as outputs on the serial-parallel converter SP01.

The parallel-serial converter PS01 can be implemented with a selector tree. The fact that the first bits of coded data are identical with the non-coded bits, i.e. these bits have not been the subject of any form of logic procedure, permits the multiplexing procedure to take place immediately after sampling, whereas the other half of the code is processed through the logic circuit. This makes further storage of the code unnecessary.

The binary counter, which includes a $\log_2$ N-bit binary counter, is necessary for generating clock signals to the serial-parallel converter SP01 and to the parallel-serial converter PS01. The counter is implemented by using a sequence "divide-by-two" structure.

A delay block D creates a time delay that is used for synchronisation and alignment between data and clock. The time delay depends on frequency, technology and logic circuit design. The delay block D is unnecessary in certain situations. The inventive encoding method affords very simple implementation and reliable transmission.

Decoder

Figure 2:
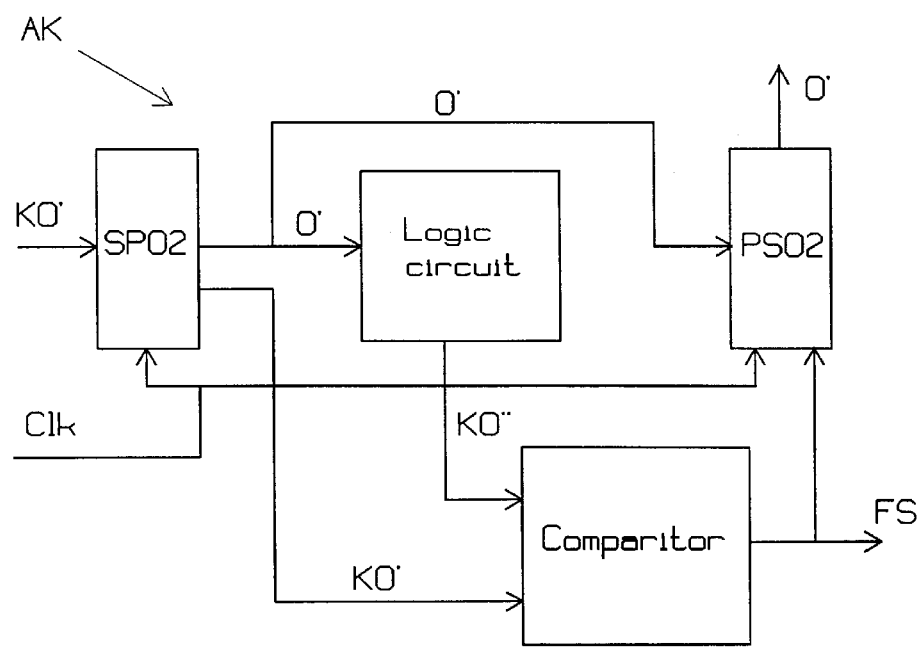
FIG. 2 illustrates a decoder for decoding serial data encoded by the encoder shown in FIG. 1.

FIG. 2 illustrates an inventive decoder AK. The decoder is intended to decode code words KO' which comprise the code words KO from the encoder to which noise in, inter alia, the transmission channel between the encoder K and the decoder AK has been added. The decoder includes a serial-parallel converter SP02, a logic circuit, a comparitor and a parallel-serial converter PS02. Clock signals from a clock Clk are used for synchronization.

The serial-parallel converter SP02 needs to read-in code words at two times the speed of the serial-parallel converter SP01 in the encoder K. This can be achieved with a conventional serial-parallel converter and double frequency clock, although this results in unnecessary limitations in characteristics of the electronic parts of the encoder and in the technology for implementing the encoder. Furthermore, it is also necessary to study the incoming bit stream and synchronize said bit stream correctly. The inventive serial-parallel converter SP02 is described below in a separate section.

The logic circuit is identical to the logic circuit described with reference to the encoder K. Input data is identical to the half O' of the 2N coded data bits KO' originating from the originally N non-encoded data bits O at the input of the encoder.

Output data KO" is compared with sample data KO' from the serial-parallel converter SP02 bit-by-bit in a comparitor. The comparison is effected particularly in respect of the check bits.

Providing that the bit-by-bit comparison gives a predetermined result, for instance the bits are in agreement, the non-coded or decoded data words O' are sampled in the parallel-serial converter PS02 and converted back to a serial bit stream.

The Serial-parallel Converter of the Encoder

According to the invention, the serial-parallel converter SP02 is intended for demultiplexing bits in a serial bit stream at a bit rate which is twice as high as the frequency of a clock connected to the serial-parallel converter SP02. Assume that the code words have a bit rate of 2 v. Clocking is then possible with a clock that has the frequency v, i.e. the same frequency as that of the originally non-coded bit stream. The solution is found in the use of both positive and negative clock signal edges. The serial-parallel converter SP02 is also adapted to read all bits in the serial bit stream and to perform full demultiplexing of the 2N bits latest read-in for each bit that is read-in. The synchronization may hereby be simpler.

The serial-parallel converter SP02 may be implemented particularly in the manner described below.

Figures 3, 4:
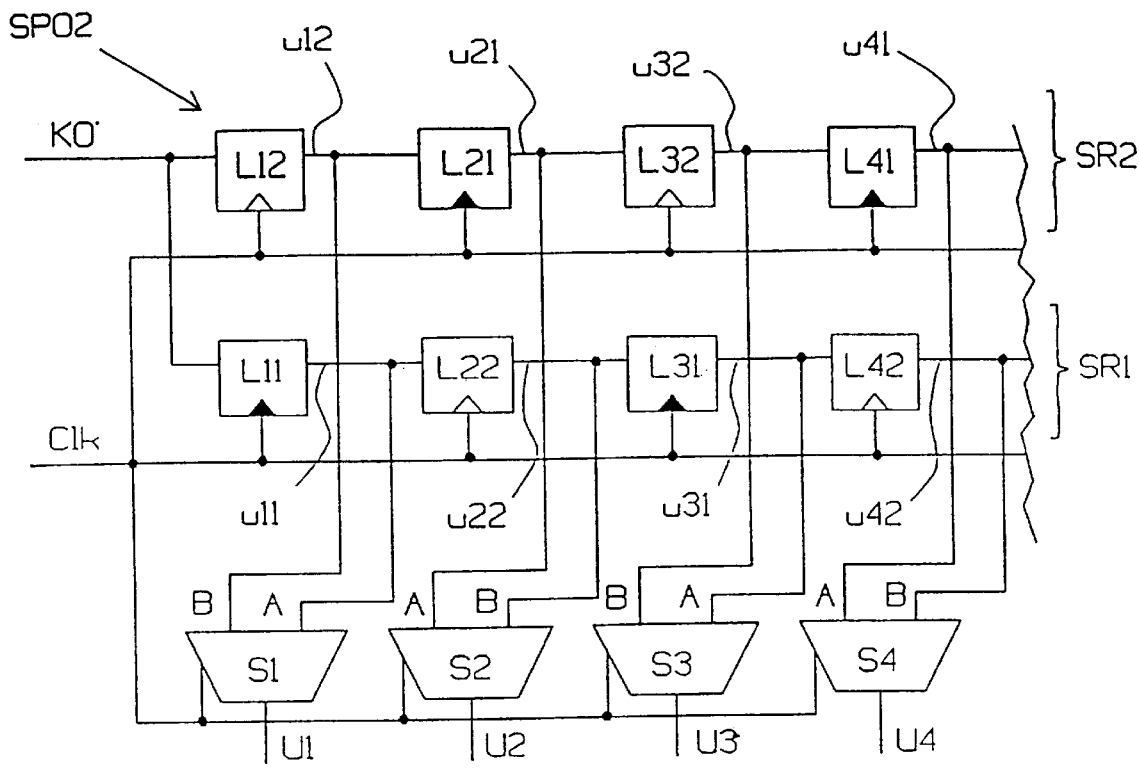
FIG. 3 illustrates a serial-parallel converter in accordance with the invention.
FIG. 4 is a function table relating to the serial-parallel converter.

Shown in FIG. 3 in accordance with the invention is a serial-parallel converter SP02 intended for code words KO' of four bits. The converter SP02 includes a first shift register SR1 and a second shift register SR2, both having the length four, and four selectors S1, S2, S3, S4. The first shift register SR1 includes four latches L11, L22, L31, L42 and the second shift register SR2 includes four latches L12, L21, L32, L41.

The latches Lx1, x=1, 2, 3, 4, are adapted to be clocked at low clock signal levels. Consequently, the latches Lx2, x=1, 2, 3, 4, are adapted to be clocked at high clock signal levels.

Each segment of the serial-parallel converter SP02 therefore includes two latches, of which one latch Lx1 is clocked at low clock signal levels and is then consequently in a transparent mode. The second latch Lx2 is then in a blocked mode. The latch that is in a transparent mode is referred to as unstable and the blocked latch as stable. The blocked latch is insensitive to data changes on the latch input.

The selectors S1, S2, S3, S4 are level-triggered and adapted to select data from the latches Lx1 at the high clock signal level, and from the latches Lx2 at the low clock signal level.

The selector inputs are designated A and B. The A-inputs are connected to the outputs of the latches Lx1 and the B-inputs are connected to the outputs of the latches Lx2. The clock signal is used to select correct stable selector inputs and thereby obtain stable data between the edges of the clock signal. Theoretically, it is also possible to select unstable selector inputs while retaining the function of the serial-parallel converter SP02.

In FIG. 3, N=2, although the serial-parallel converter SP02 can be readily scaled in N. For arbitrary N, the serial-parallel converter SP02 includes 4N latches and 2N selectors.

The modus operandi of the serial-parallel converter SP02 will now be described in more detail, with reference to FIG. 4.

A serial bit stream of encoded data in groups of four bits KO' arrives at the input of the serial-parallel converter SP02. The values a1, a2, a3 and a4 are present on the outputs u41, u31, u21 and u11 at a given moment in time.

A positive clock signal edge occurs, i.e. the clock signal passes from a low to a high state. Consequently, the latches Lx1, x=4, 3, 2 and 1, are blocked and retain their data on the outputs. One bit data is read-in by the latch L12, wherewith all latches Lx2, x=4, 3, 2 and 1, shift values one step or increment to the right, so that the values a2, a3, a4 and a5 are obtained on the outputs u42, u32, u22 and u12. These latches are in the so-called transparent state. The selectors S4, S3, S2, S1 have on their respective outputs U4, U3, U2, U1 those values that are found on the input A when the clock signal is in its high state, i.e. those values that are present on the outputs u41, u31, u21, u11. Thus, the values a1, a2, a3 and a4 are obtained on the outputs U4, U3, U2, U1.

A negative flank then appears and the clock signal passes from a high state to a low state. The following then applies: The latches Lx1 become transparent and the values a3, a4, a5, a6 are obtained based on the outputs u41, u31, u21, u11. The latches Lx2 are blocked and the values a2, a3, a4, a5 are retained on the outputs u42, u32, u22 and u12. The selectors S4, S3, S2, S1 have on their outputs U4, U3, U2, U1 those values that are present on the inputs B, i.e. the values from u42, u32, u22 and u12. Thus, the values a2, a3, a4, a5 are obtained on outputs U4, U3, U2, U1.

As will be understood, the values a3, a4, a5 and a6 are obtained on the outputs U4, U3, U2 and U1 after the next clock signal edge and the values a4, a5, a6 and a7 are obtained at the next clock signal edge. Thus, full demultiplexing of the four latest bits read-in is obtained after each positive and each negative edge of the clock signal. In principle, the selectors S4, S3, S2, S1 can select the unstable outputs of the latches. However, this will result in the risk of, inter alia, transients on the outputs, which renders this method uncertain.

Figures 5, 6:
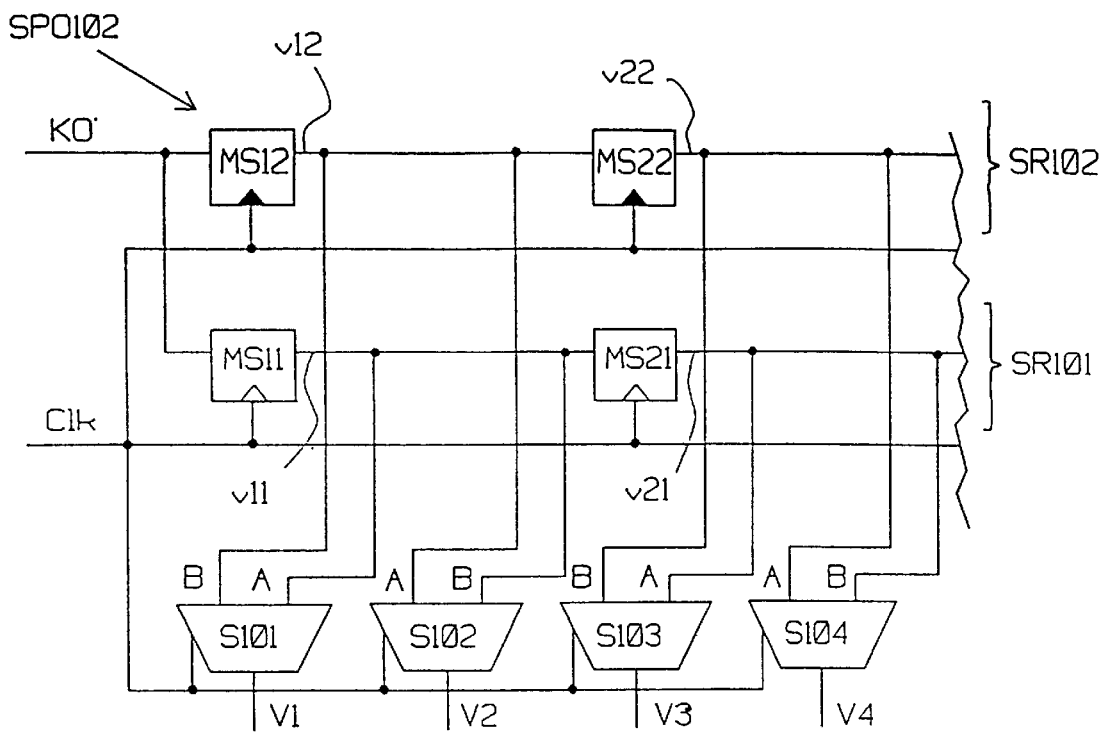
FIG. 5 illustrates a second embodiment of a serial-parallel converter.
FIG. 6 is a function table relating to the second embodiment of a serial-parallel converter.

FIG. 5 shows another embodiment of a serial-parallel converter SP0102, which is also intended for serial-parallel conversion of code words KO' comprising four bits. This converter includes a first shift register SR101 which includes two MS flip-flops, MS11, MS21, a second shift register SR102 which includes two MS flip-flops MS12, MS22, and four selectors S101, S102, S103, S104.

It is necessary to use in this embodiment MS flip-flops or at least flip-flops that are truly edge-triggered, i.e. flip-flops which are insensitive to changes in input data arriving after the edge.

The shift registers SR101, SR102 are arranged in parallel. The MS flip-flops MS11, MS21 in the first shift register SR101 are adapted to be clocked at positive edges of the clock signal, and the MS flip-flops MS12, MS22 in the second shift register SR102 are adapted to be clocked at negative edges of the clock signal.

The selector inputs are designated A and B. The A-inputs are connected in sequence to the outputs v11, v12, v21, v22 of the MS flip-flops MS11, MS12, MS21, MS22. The B-inputs are connected in sequence to the outputs v12, v11, v22, v21 of the MS flip-flops MS12, MS11, MS22, MS21. The selectors S101, S102, S103, S104 are adapted to select data from the A-inputs when the clock signal is high and from the B-inputs when the clock signal is low. The outputs of the selectors S101, S102, S103, S104 are designated V1, V2, V3, V4.

FIG. 6 is a functional table for this embodiment of serial-parallel converter SP0102.

The proposed code implementation uses both edges of the clock signal, therewith obviating the need of doubled clock frequency. According to the invention, the serial-parallel converter can be scaled for use with arbitrary N.

By doubling the frequency of the bit stream in the coded signal and by limiting and minimising the number of consecutive symbols, i.e. ones or zeros, lower demands are placed on the lower cut-off frequency of used amplifiers. This greatly facilitates the construction of these amplifiers.

Because complete demultiplexing of the 2N latest read-in bits is carried out for each bit read-in, complicated synchronising logic is avoided with respect to reading in data.

Examples of Code Tables and Logic Functions

Two examples of the possible configuration of a code table and a logic function in accordance with the present invention will be described in the following with reference to FIGS. 7–10.

The following code requirements are applicable in both examples.

The word length shall be four, N=4, and the code word length shall be eight, 2N=8.

Four of the eight bits in the code word KO shall be comprised of the four bits input data and these bits shall be essentially found at the beginning of the code word KO.

The sixteen code words KO, which represent the sixteen different word possibilities, shall, of course, be different.

At least one of the eight bits in the code words KO shall comprise the inverted value of one of the four bits input data.

In the first example, the following demands are placed on the code.

The code shall be strictly d.c. stable.

Only the code words for 0000 and 1111 need remain unique in bit stream shifting processes.

A resultant code table is shown in FIG. 7 and corresponding functions required of the logic circuit are shown in FIG. 8. As will be seen, the four non-coded bits are on the sites 1, 2, 3 and 5. This is accepted as being placed essentially in the beginning of the code order KO. It can be shown that the requirement for all non-coded bits to come first, for strict d.c. stability to prevail, and for all code words in the table to remain unique in bit stream shifting processes will not result in a functioning code. The requirements are contradictory in themselves.

It will be noted that the serial-parallel converters SP02, SP0102 shown in FIGS. 3 and 5 can be used fully satisfactorily for decoding coded data according to the present example, when the converters are re-scaled to apply to N=4.

In the second example, the following code requirements apply in addition to those aforementioned.

The code shall be statistically d.c. stable.

All code words KO shall remain unique in bit stream shifting processes.

A resultant code table is shown in FIG. 9 and corresponding logic circuit functions are shown in FIG. 10.

Both code tables are invertable, i.e. if the word O is inverted then the code word KO is also inverted. This is particularly desirable in optical transmission systems.

Transmission System

The aforedescribed encoder and decoder may conveniently be used for channel coding in transmission systems, particularly in multi-channel fibre-optic transmission systems. Two such systems will be described below.

1. Synchronous transmission in which one channel transmits the clock signal, shown in FIG. 11.

2. Asynchronous transmission in which the clock signal is recreated from one or more data channels at the receiver, shown in FIG. 12.

The synchronous transmission system and the asynchronous transmission system both include a transmitter side S and a receiver side M.

In the synchronous case, the transmission system includes five transmission channels, of which four channels T are data transmission channels and one channel ClkT is used to transmit a clock signal Clk. Each channel is connected to an amplifier F both on the transmitter side S and the receiver side M. Each data channel is connected to an encoder A on the transmitter side S and to a decoder AK on the receiver side M. These encoders K and decoders AK are of the aforedescribed kind. The decoders AK will preferably include serial-parallel converters SP02, as shown in FIG. 3 and described above. The transmitted clock signal Clk is used for synchronising data incoming to the decoders AK.

In the asynchronous case, the transmission system includes four channels T, all of which are intended for transmission of data. Each channel is also connected in this case to an amplifier F on both the transmitter side S and the receiver side M. Each channel is also connected in this case to an encoder K on the transmitter side S and a decoder AK on the receiver side M. The decoders AK will preferably include serial-parallel converters SP02, as before described. It is necessary to recreate from one or more data channels on the receiver side a clock signal Clk for synchronising data incoming to the decoders AK. This is effected in a clock recovery facility Clk Å, implemented with phase-locked loop structures, for instance.

Figure 11:
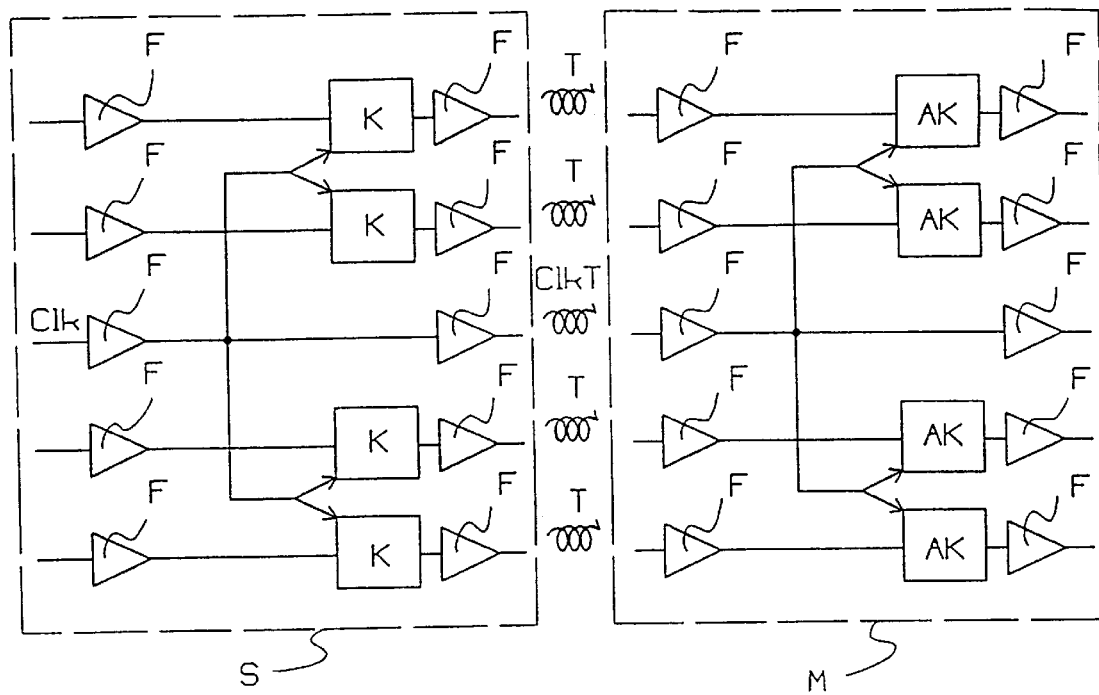
FIG. 11 illustrates a synchronous transmission system according to the invention, in which a clock signal is transmitted in a transmission channel.
Figure 12:
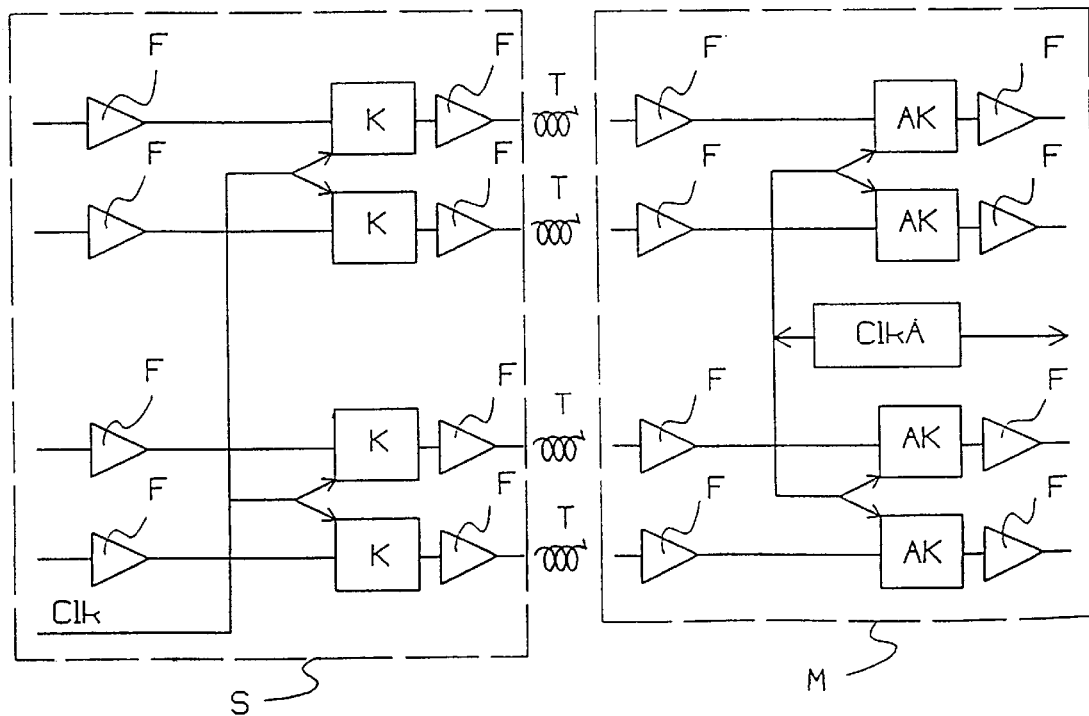
FIG. 12 illustrates an asynchronous transmission system according to the invention, wherein a clock signal is recreated from one or more data channels on a receiver side.

FIGS. 11 and 12 illustrate systems for data transmission in four channels, although it will be understood that the invention can also be implemented with any chosen number of channels. Each channel includes an encoder K on the transmitter side S and a decoder AK on the receiver side.

In the case of synchronous transmission, the lower cut-off frequency is determined mainly by the performance of the amplifiers F on the receiver side M. In the case of asynchronous transmission, the lower cut-off frequency is also determined by the clock recovery facility Clk Å.

By channel coding in accordance with the present invention, the lower cut-off frequency is moved up—to which extent depends on the configuration of the coding concerned. It then becomes possible to transmit a chosen number of words that consist solely of ones or solely of zeros without loosing data.

The need of complex encoding hardware and decoding hardware can be minimized by accurately defining the code characteristic, without needing to increase the system clock frequency. The bit error frequency can also be reduced by the introduction of intelligent types of code.

The present invention includes an arrangement and a method for uncomplicated and reliable encoding and decoding at high transmission rates, particularly transmission rates in the gbit/s range, using block codes.

It will be understood that the invention is not restricted to the aforedescribed and illustrated exemplifying embodiments thereof and that modifications can be made within the scope of the following claims.

What is claimed is:

1. An encoder for coding a serial bit stream of input data arranged in groups of N bit data words into serial output data arranged in codewords of 2N bits, comprising:
    a serial-parallel converter receiving said serial bit stream of N-bit data words and developing N-bit words in parallel;
    a logic circuit receiving said N-bit words in parallel and logically altering selected bits of said N-bit words; and
    a parallel-serial converter receiving the output of said logic circuit and producing said codewords of 2N bits;
    said encoder being configured so that N of the 2N bits in each said codeword are comprised of the N bits of the input data words, unchanged or inverted, and
    said encoder further being configured so that remaining bits in each of the codewords are determined so that, seen statistically, the codewords include approximately as many zeros as ones, so that each codeword is unique for each word, and that at least one of the codewords remains unique among said codewords despite bit stream shifting processes.

2. An encoder according to claim 1, wherein the encoder is arranged so that, seen statistically, a group of the codewords contain equally as many zeros as ones.

3. An encoder according to claim 1, wherein the encoder is adapted so that each codeword will include equally as many zeros as ones.

4. An encoder according to any one of claims 1, wherein the encoder is adapted so that the codewords for those data words that contain solely zeros and solely ones will remain unique in bit stream shifting processes.

5. An encoder according to any one of claims 1–4, wherein the encoder is adapted so that all codewords will remain unique in bit stream shifting processes.

6. An encoder according to any one of claims 1–4, wherein the encoder is adapted so that at least one of the 2N bits in the codewords will comprise the inverted value of one of the N bits input data.

7. An encoder according to claim 6, wherein the encoder is adapted so that the number of bits in the codewords developed by inverting bits of input data is maximized.

8. An encoder according to claim 6, wherein the encoder is adapted so that the inverted bits in the codeword are obtained in the serial-parallel converter.

9. An encoder according to claim 8, wherein the encoder is adapted so that the N bits input data are placed mainly in the first half of the codeword.

10. An encoder according to claim 9, wherein the encoder is adapted so that words that are invertable are encoded to codewords, said codewords also being invertable.

11. An encoder according to claim 10, wherein the logic circuit has a gate depth of two.

12. An encoder according to claim 11, wherein the encoder is adapted so that said words include four bits and the codewords eight bits.

13. A decoder for decoding a serial coded bit stream of input data arranged in groups of 2N bit code words to serially output data arranged in data words of N bits, said code words being related code words that have been coded by the encoder according to claim 1, said decoder comprising:
    a serial-parallel converter receiving said code words, said code words including data word bits unchanged or inverted from said data words combined with code word bits logically related to said data word bits and generated by a coding method;
    a logic circuit receiving said data word bits, in parallel and logically developing check bits therefrom, the logic circuit using the coding method used to generate the code word bits to generate said check bits;
    a comparator comparing said check bits to said code word bits; and
    a parallel-serial converter adapted to parallel-serial convert the data word bits output from said serial-parallel converter to form serially output data words in the event that the comparison in the comparator gives a predetermined result.

14. A decoder according to claim 13, wherein the encoder includes a serial-parallel converter according to any one of claims 14–15.

15. A transmission system, wherein said system includes at least one encoder according to claim 1 and at least one decoder according to claim 13.

16. A transmission system according to claim 15, wherein said system includes at least one serial-parallel converter according to claim 14.

17. A transmission system according to claim 15, wherein said system includes a clock whose clock signal is intended for transmission in a transmission channel.

18. A transmission system according to claim 15, wherein said system includes a clock recovery facility on a receiver side.

19. A method of decoding a serial, encoded bit stream of input data in groups of 2N bit codewords into serial output data in data words of N bits, said codewords including data word bits unchanged or inverted from said data words combined with codeword bits logically related to said data word bits, said codewords being exposed to noise while being sent across a communication channel after being coded by the system of claim 21, comprising the steps of:
    demultiplexing the codewords by,
    providing a clocking signal to a decoder circuit, and
    reading all bits of said codewords while using for clocking purposes both positive and negative flanks of the clocking signal of frequency v and performing complete demultiplexing of the 2N bits last read-in for each bit read-in;
    separating data word bits in said codewords from the codeword bits in said codewords to form data words;
    logically developing check bits from said data word bits;
    comparing the codeword bits of said codewords with the logically developing check bits in a predetermined manner; and
    parallel-serial converting the data words in the event of the comparison giving a predetermined result.

20. A high speed redundant code generator comprising:
    a logic circuit receiving data words having plural bits in parallel and performing simple logic operations on said data word bits to produce codeword bits;
    a combiner assembling said data word bits with said codeword bits to produce a unique codeword associated with each data word therefrom, said codewords produced by said combiner containing said data word bits unchanged or inverted as well as said codeword bits;

said logic circuit generating codeword bits that, when assembled with said data word bits by said combiner, produce a codeword that has approximately as many logical zeros as ones and wherein at least one of said codewords is unique after any bit stream shifting.

21. A signal transmitting a digital bit stream encoding a series of data words comprising:

plural codewords, each said codeword including a plurality of bits including, plural data word bits obtained directly or inverted from said data words, plural codeword bits, each said codeword bit being developed in a simple logic operation from one or more of said plural data word bits;

said plural data word bits and said plural codeword bits being assembled to form plural codewords, each data word being uniquely defined by a codeword, said codewords having approximately as many logical zeros as ones and wherein at least one of said codewords is unique after any bit stream shifting;

wherein said signal is produced by the code generator of claim 20.

22. A high speed redundant decoder for decoding codewords that each uniquely identify data words, said codewords being formed of data word bits corresponding directly or inverted from said data word combined with codeword bits logically related to said data word bits, where said codewords are transmitted across a channel that may contain noise, said codewords having approximately as many logical zeros as ones and wherein at least one of said codewords is unique after any bit stream shifting, said decoder comprising:

a separator separating said codeword bits from said data word bits;

a logic circuit receiving said data word bits having plural bits in parallel and performing simple logic operations on said data word bits to produce check code bits;

a comparitor comparing said check code bits with said codeword bits; and a circuit passing said data word bits as the data word if said check code bits correspond to said codeword bits to detect the effects of any noise present in the transmission channel.

23. A signal transmitting a digital bit stream encoding a series of data words comprising:

plural codewords, each said codeword including a plurality of bits including, plural data word bits obtained directly or inverted from said data words, plural codeword bits, each said codeword bit being developed in a simple logic operation from one or more of said plural data word bits;

said plural data word bits and said plural codeword bits being assembled to form plural codewords, each data word being uniquely defined by a codeword, said codewords having approximately as many logical zeros as ones and wherein at least one of said codewords is unique after any bit stream shifting;

wherein said signal is decoded by the decoder of claim 22.

24. A serial-parallel converter for demultiplexing bits in a serial bit stream of frequency 2 v, wherein the converter is adapted to utilize both positive and negative edges of a clock signal of clocking frequency v, and to read all bits in the serial bit stream and perform complete demultiplexing of the 2N bits last read-in for each bit that is read-in, wherein the converter includes, a first shift register receiving a clock signal and having 2N latches;

a second shift register arranged in parallel with said first shift register, receiving the clock signal and having 2N latches; and 2N selectors;

even number latches of said first shift register being clocked at a high clock signal level and odd number latches of said first shift register being clocked at a low clock level while even number latches of said second shift register are clocked at a low clock signal level and odd number latches of said second shift register are clocked at a high clock signal level, and vice versa;

the selectors selecting data from those latches of said first and second shift registers that are not clocked after each clock signal edge.

25. A serial-parallel converter for demultiplexing bits in a serial bit stream of frequency 2v, wherein the converter is adapted to utilize both positive and negative edges of a clock signal of clocking frequency v, and to read all bits in the serial bit stream and perform complete demultiplexing of the 2N bits last read-in for each bit that is read-in, wherein the converter includes, a first shift register receiving a clock signal and having N MS flip-flops;

a second shift register arranged in parallel with said first shift register, receiving the clock signal and having N MS flip-flops; and 2N selectors;

the MS flip-flops in said first shift register being clocked by the positive edge of said clock signal while the MS flip-flops of said second shift register being clocked by the negative edge of said clock; and alternate said selectors selecting data from said first shift register and the other alternate said selectors selecting data from said second shift registers after positive edges of the clock signal the selection of said data from said first and second shift registers by said alternate selectors reversing after negative clock signal edges.

* * * * *